Patented June 18, 1940

2,205,256

UNITED STATES PATENT OFFICE 2,205,256

PURIFICATION OF LACTIC ACID

Ivan L. Haag and Charles A. Vana, Cleveland, Ohio, assignors to E. I. du Pont de Nemours & Company, Wilmington, Del., a corporation of Delaware No Drawing. Application October 22, 1937, Serial No. 170,387

5 Claims. (Cl. 260—535)

This invention relates to processes for the purification of lactic acid and is more particularly directed to processes wherein lactic acid treated with nitric acid and containing a cyanide as an impurity is further purified by treatment with a silver compound.

In an application No. 10,458, filed March 11, 1935, for Purification of lactic acid of which this application is a continuation in part, we have shown processes for the purification of lactic acid according to which the acid is first treated with nitric acid as an oxidizing agent and then excess nitric acid is removed as by the use of activated carbon or decolorizing carbon. Excess nitric acid may also be eliminated by the use of heavy base metals such as aluminum or copper.

The treatment of lactic acid with nitric acid to effect purification causes the formation of cyanides which remain in the lactic acid after treatment. Chlorine ions are sometimes introduced into the lactic acid by the use of activated carbon and remain after treatment as an impurity in the lactic acid.

Now we have found that an improved lactic acid may be prepared by treating nitric acid-treated lactic acid with a compound of silver. By such treatment any cyanides present in the acid combine with the silver to form an insoluble precipitate from which the lactic acid may readily be separated. Chlorine and other such impurities, if present, will also be separated by the combination with silver to form an insoluble precipitate.

According to the processes of our present invention, lactic acid which has been treated with nitric acid and from which excess of nitric acid has been removed is treated with a soluble silver compound using the amount of silver compound required completely to precipitate any impurities present. It is usually convenient to remove excess nitric acid before treatment with a silver compound, but if desired, a silver compound may be added before removal of excess nitric acid.

Any silver compound may be employed to precipitate impurities from lactic acid according to our invention provided of course that the compound be more soluble than the compound of silver with cyanide. We prefer to use silver lactate because in this way no objectionable anion is introduced into the lactic acid. Other soluble silver compounds which may be used if the anions are not so objectionable in a particular instance as prohibit their use are silver carbonate, silver acetate, and silver sulfate.

So that our invention may be more fully understood reference should be had to the following illustrative example:

Example

Two hundred parts by weight of a fifty per cent solution of edible lactic acid prepared by partial purification of lactic acid made by fermentation of molasses was heated to a temperature of 90° C. To the lactic acid there was added 5.7 parts by weight of a seventy per cent C. P. nitric acid solution. After the addition of nitric acid the heating was continued for four hours holding the temperature between about 90 and 95° C.

The nitric acid-treated lactic acid was concentrated to eighty per cent and there was then added four parts by weight of activated carbon. The mixture was stirred for three hours at 90 to 95° C. The activated carbon was then allowed to settle out. The clear acid was syphoned off and was again treated using one part by weight of fresh activated carbon.

Iron, which like chlorine is an impurity introduced by the activated carbon, was precipitated from the acid by adding potassium ferrocyanide until no further precipitate formed. The lactic acid was then separated from the carbon and precipitates of iron ferrocyanide.

The lactic acid solution containing cyanides principally in the form of hydrogen cyanide was then further purified by adding silver lactate until no further precipitate was obtained. Chlorine of course was precipitated at the same time. The lactic acid was separated from the precipitate by decanting. An analysis showed that substantially complete removal of cyanide had been effected.

It is preferred as shown above to separate the lactic acid from the precipitate obtained by treatment with ferrocyanide before adding silver, but this is not essential. It is further observed that if an excess of ferrocyanide is used the treatment with silver effects its removal.

While we have shown certain specific illustrative examples and conditions herein, it will be understood that one skilled in the art may without departing from the spirit of our invention readily devise numerous ways of treating lactic acid with a soluble silver compound to remove impurities.

We claim:

1. In a process for the purification of lactic acid which contains cyanide as an impurity, the step comprising adding a soluble silver compound to the lactic acid to precipitate the cyanide.

2. In a process for the purification of lactic acid which contains cyanide as an impurity, the step comprising precipitating the cyanide with silver lactate.

3. In a process for the purification of lactic acid, the step comprising treating the lactic acid with nitric acid, removing the excess nitric acid, and treating the lactic acid with a soluble silver compound.

4. In a process for the purification of lactic acid, the step comprising treating the lactic acid with nitric acid, removing the excess nitric acid, and treating the lactic acid with silver lactate.

5. In a process for the purification of lactic acid, the step comprising treating the lactic acid with nitric acid, treating the lactic acid with activated carbon, and treating the lactic acid with silver lactate to effect substantially complete removal of impurities which are precipitated by silver lactate.

IVAN L. HAAG.
CHARLES A. VANA.